US012664677B2

(12) United States Patent
Liu et al.

(10) Patent No.: US 12,664,677 B2
(45) Date of Patent: Jun. 23, 2026

(54) IMAGE ANALYSIS APPARATUS, IMAGE ANALYSIS METHOD, AND A NON-TRANSITORY STORAGE MEDIUM

(71) Applicant: NEC Corporation, Tokyo (JP)

(72) Inventors: Jianquan Liu, Tokyo (JP); Noboru Yoshida, Tokyo (JP); Tingting Dong, Tokyo (JP); Ryo Kawai, Tokyo (JP); Satoshi Yamazaki, Tokyo (JP); Karen Stephen, Tokyo (JP); Yuta Namiki, Tokyo (JP); Naoki Shindou, Tokyo (JP); Youhei Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 337 days.

(21) Appl. No.: 18/216,208

(22) Filed: Jun. 29, 2023

(65) Prior Publication Data
US 2024/0013428 A1     Jan. 11, 2024

(51) Int. Cl.
| *G06T 7/70* | (2017.01) |
| *G06F 3/14* | (2006.01) |
| *G06V 10/44* | (2022.01) |

(52) U.S. Cl.
CPC .................. *G06T 7/70* (2017.01); *G06F 3/14* (2013.01); *G06V 10/44* (2022.01); *G06T 2207/30242* (2013.01)

(58) Field of Classification Search
CPC ............. G06T 7/70; G06T 2207/30242; G06T 2207/30196; G06T 2207/30232; G06T 7/246; G06T 7/292; G06F 3/14; G06V 10/44; G06V 40/10; G06V 20/53
See application file for complete search history.

(56) References Cited

U.S. PATENT DOCUMENTS

| 2008/0109397 A1* | 5/2008 | Sharma .................. G06Q 30/02 |
| 2016/0110613 A1 | 4/2016 | Ghanem et al. |

FOREIGN PATENT DOCUMENTS

| CN | 108875695 A | * 11/2018 | .......... G06V 40/166 |
| JP | 2011-008571 A | 1/2011 | |
| JP | 2016146612 A | * 8/2016 | |
| JP | 2019192154 A | * 10/2019 | |

(Continued)

OTHER PUBLICATIONS

Zhe Cao, Tomas Simon, Shih-En Wei, Yaser Sheikh, "Realtime Multi-Person 2D Pose Estimation using Part Affinity Fields"; The IEEE Conference on Computer Vision and Pattern Recognition (CVPR), 2017, pp. 7291-7299.

(Continued)

*Primary Examiner* — Edward Park
*Assistant Examiner* — Alexander Joseph Vaughn
(74) *Attorney, Agent, or Firm* — Sughrue Mion, PLLC

(57) ABSTRACT

To utilize a result of image analysis, an image analysis apparatus 100 includes an analysis result acquisition unit 110 and a counting unit 111. The analysis result acquisition unit 110 acquires analysis information being information acquired by analyzing a still image and including an appearance attribute to which a person included in the still image belongs. The counting unit 111 counts, for each appearance attribute, the number of persons belonging to the appearance attribute in the still image by using the analysis information, and generates counting information indicating a result of the counting in units of still images.

15 Claims, 15 Drawing Sheets

(56)         References Cited

FOREIGN PATENT DOCUMENTS

| | | | |
|---|---|---|---|
| JP | 2020-067720 | A | 4/2020 |
| JP | 2020-086994 | A | 6/2020 |
| JP | 2020-155089 | A | 9/2020 |
| JP | 2021-046015 | A | 3/2021 |
| JP | 2021077245 | A * | 5/2021 |
| JP | 2022-079321 | A | 5/2022 |
| WO | 2021/084677 | A1 | 5/2021 |

OTHER PUBLICATIONS

Extended European Search Report for EP Application No. 23183593. 5, dated on Feb. 12, 2024.

Jaiganesh Nagidi, "How to Build Gender Wise Face Recognition & Counting Application With OpenCV", Nov. 25, 2020 (Nov. 25, 2020), pp. 1-26.

JP Office Action for JP Application No. 2022-108649, mailed on Feb. 17, 2026 with English Translation.

Tohru Katori, "Visualization of Customers' Behavior by Video Analysis Technology on Car Dealer and Utilization of Results," Communications of JIMA, vol. 31, No. 1, Japan Industrial Management Association, Jul. 15, 2021, pp. 34-40.

* cited by examiner

| ANALYSIS INFORMATION | | | | | | |
|---|---|---|---|---|---|---|
| IMAGE INFORMATION | | ANALYSIS RESULT | | | | |
| IMAGE ID | CAPTURING APPARATUS ID | CAPTURING TIME | HUMAN ID | PERSON ID | POSITION | APPEARANCE ATTRIBUTE | RELIABILITY |

FIG. 8

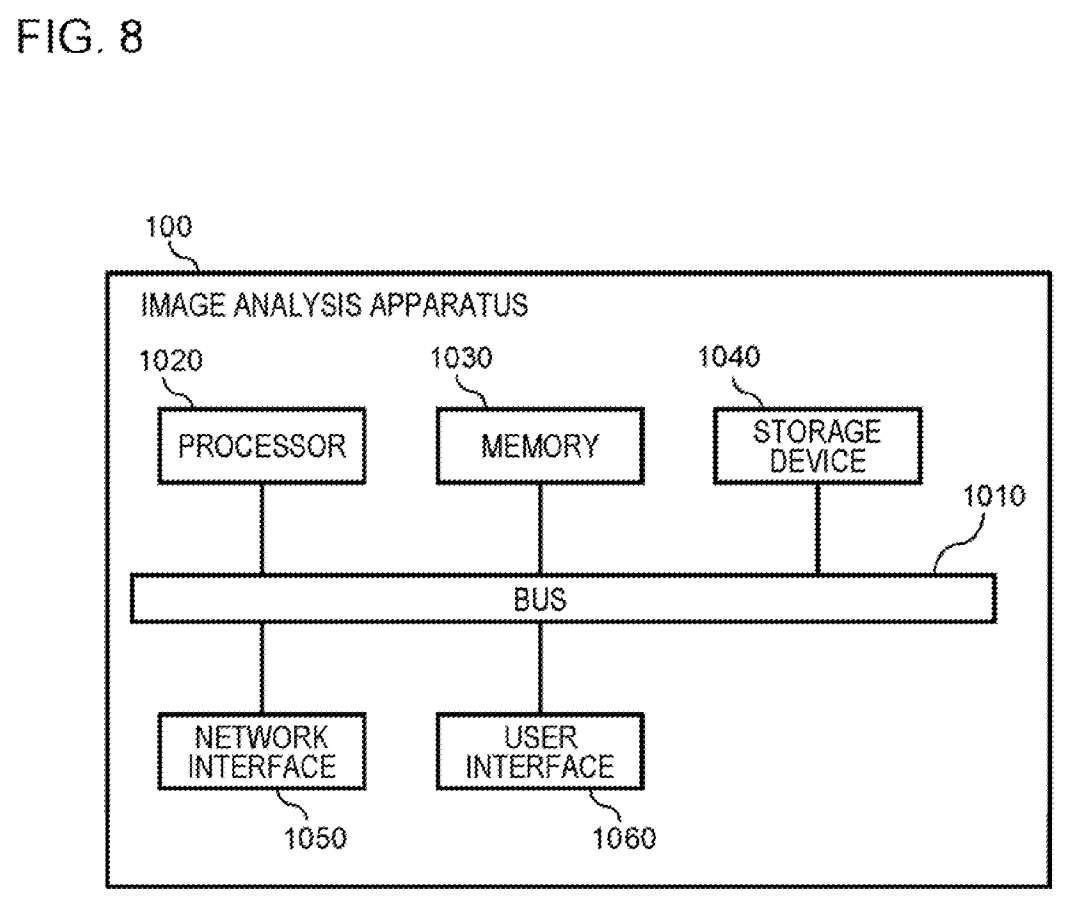

IMAGE ANALYSIS APPARATUS

100

1040 STORAGE DEVICE

1010

1030 MEMORY

1020 PROCESSOR

BUS

1060 USER INTERFACE

1050 NETWORK INTERFACE

Figure 11:
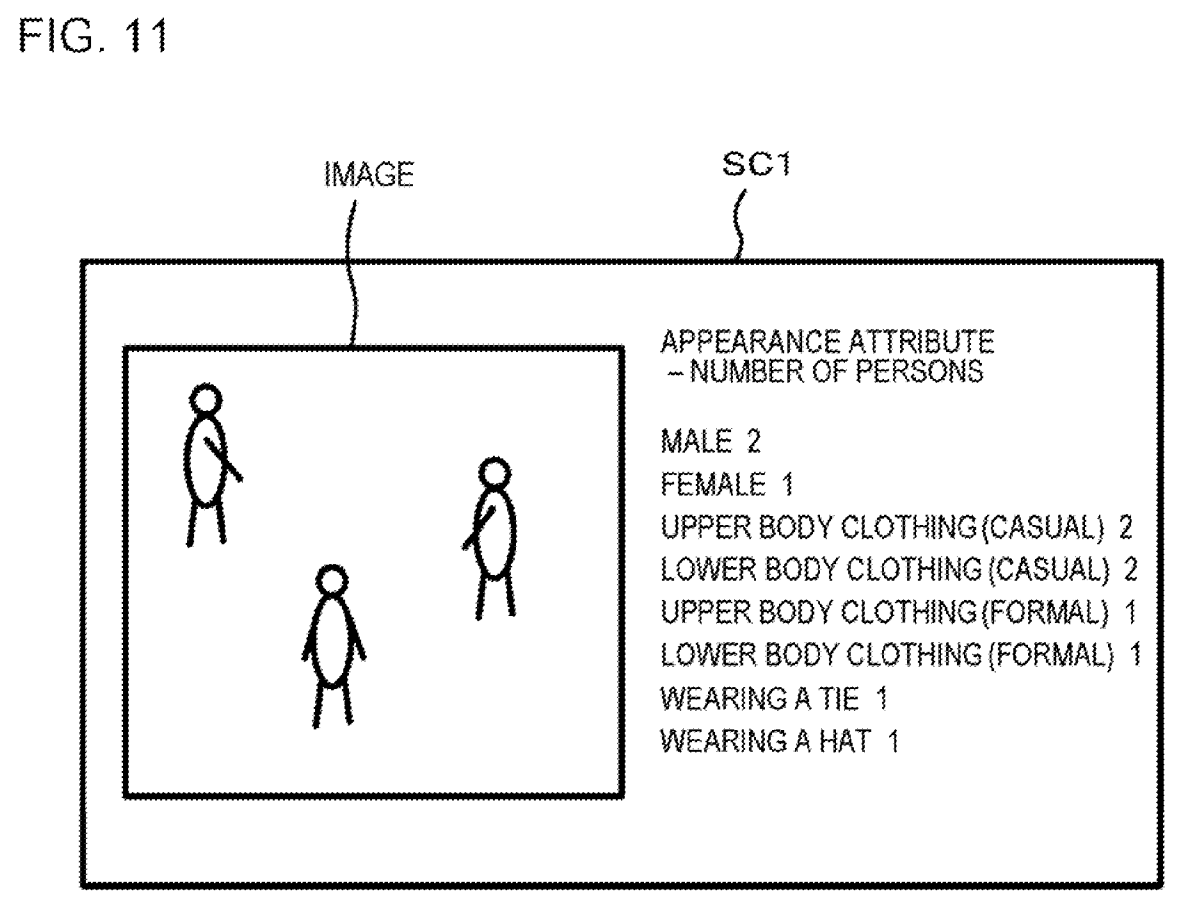

IMAGE

APPEARANCE ATTRIBUTE
–NUMBER OF PERSONS

MALE 2
FEMALE 1
UPPER BODY CLOTHING (CASUAL) 2
LOWER BODY CLOTHING (CASUAL) 2
UPPER BODY CLOTHING (FORMAL) 1
LOWER BODY CLOTHING (FORMAL) 1

WEARING A TIE 1
WEARING A HAT 1

Figure 13:
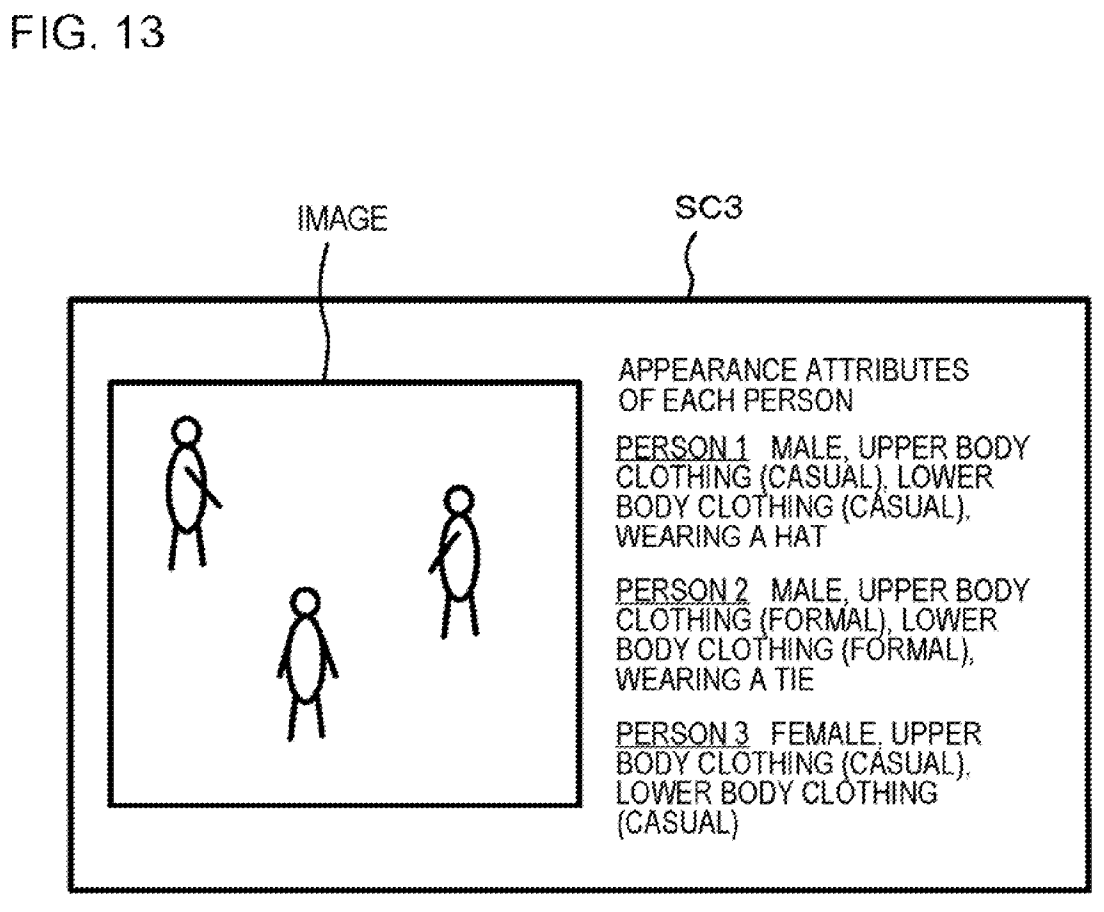

IMAGE

APPEARANCE ATTRIBUTES
OF EACH PERSON

PERSON 1  MALE, UPPER BODY
CLOTHING (CASUAL), LOWER
BODY CLOTHING (CASUAL),
WEARING A HAT

PERSON 2  MALE, UPPER BODY
CLOTHING (FORMAL), LOWER
BODY CLOTHING (FORMAL),
WEARING A TIE

PERSON 3  FEMALE, UPPER
BODY CLOTHING (CASUAL),
LOWER BODY CLOTHING
(CASUAL)

Figure 14:
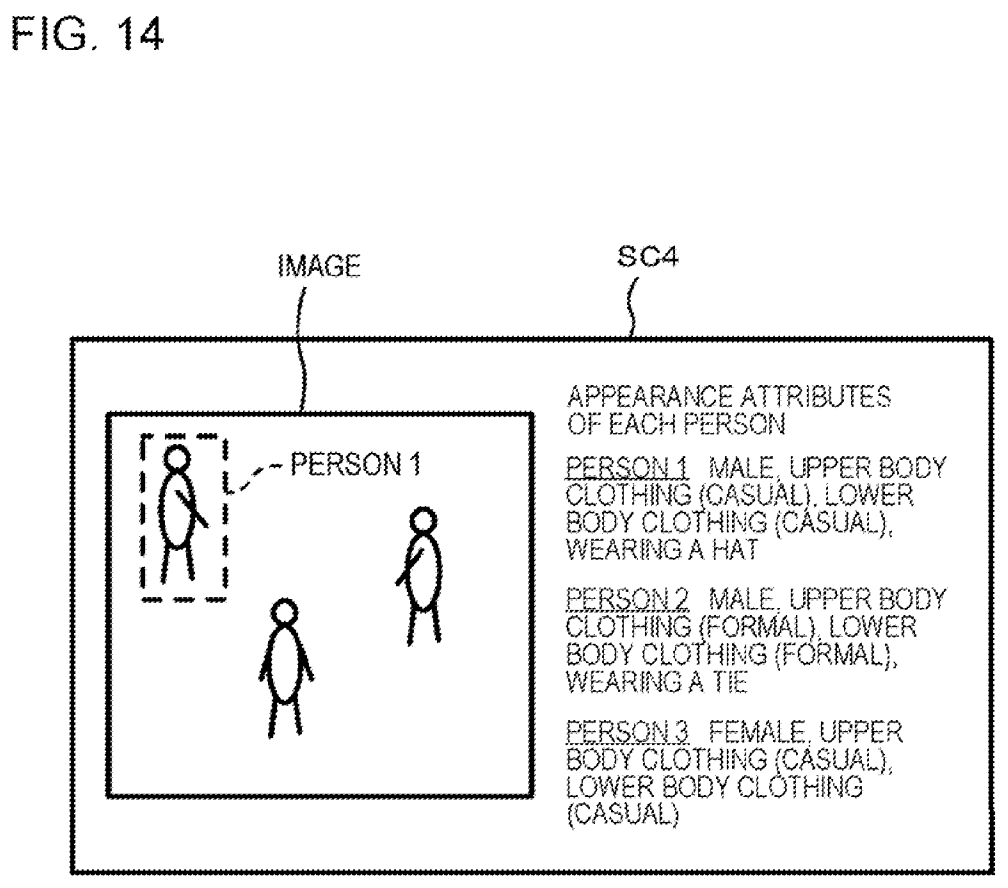

APPEARANCE ATTRIBUTES
OF EACH PERSON

PERSON1  MALE, UPPER BODY
CLOTHING (CASUAL), LOWER
BODY CLOTHING (CASUAL),
WEARING A HAT

PERSON2  MALE, UPPER BODY
CLOTHING (FORMAL), LOWER
BODY CLOTHING (FORMAL),
WEARING A TIE

PERSON3  FEMALE, UPPER
BODY CLOTHING (CASUAL),
LOWER BODY CLOTHING
(CASUAL)

IMAGE

PERSON 1

IMAGE ANALYSIS APPARATUS, IMAGE ANALYSIS METHOD, AND A NON-TRANSITORY STORAGE MEDIUM

RELATED ART

The present invention relates to an image analysis apparatus, an image analysis method, and a non-transitory storage medium.

PTL 1 (Japanese Patent Application Publication No. 2020-086994) discloses a surveillance system that counts the number of predetermined persons from a video by a surveillance camera.

PTL 2 (Japanese Patent Application Publication No. 2020-067720) discloses a person attribute estimation system that can be used for estimating an attribute of a person in a real area.

The person attribute estimation system includes an information processing apparatus and an AI estimating and computing unit. The information processing apparatus described in PTL 2 extracts person feature information representing an appearance feature of a person extracted from an image, and acquires person attribute information representing an attribute of a person having the appearance feature represented by the person feature information. For a person appearing in each of a plurality of images, the AI estimating and computing unit described in PTL 2 learns, by using the person feature information and the person attribute information, according to a predetermined AI learning process, an attribute of a person whose appearance feature is represented by the person feature information, and estimates and computes, according to a predetermined AI estimation process, the person attribute information representing the attribute of the person.

PTL 3 (International Patent Publication No. WO2021/084677) describes a technique of computing feature values of each of a plurality of keypoints of a human body included in an image, and searching for an image including a human body having a similar pose or a human body performing a similar motion, based on the computed feature value, or classifying images having similar poses or motions in groups. NPL 1 (Zhe Cao, Tomas Simon, Shih-En Wei, Yaser Sheikh, [Realtime Multi-Person 2D Pose Estimation using Part Affinity Fields], The IEEE Conference on Computer Vision and Pattern Recognition (CVPR), 2017, pages 7291 to 7299) describes a technique related to skeleton estimation of a person.

SUMMARY

However, PTL 1 does not disclose a method for utilizing attributes of a person acquired for each image constituting a video. Further, PTL 2 does not disclose a method for utilizing person attribute information of a person acquired for each image. PTL 3 and NPL 1 also do not disclose a technique for utilizing a result of analyzing an image.

One example object of the present invention is, in view of the problem described above, to provide an image analysis apparatus, an image analysis method, a program and the like that solve the problem of utilizing a result of analyzing an image.

One aspect of the present invention provides an image analysis apparatus including:

an analysis result acquisition means for acquiring analysis information being information acquired by analyzing a still image and including an appearance attribute to which a person included in the still image belongs; and a counting means for counting, for each of the appearance attributes, the number of persons belonging to the appearance attribute in the still image by using the analysis information, and generating counting information indicating a result of the counting in units of the still images.

One aspect of the present invention provides an image analysis method including, by a computer:

acquiring analysis information being information acquired by analyzing a still image and including an appearance attribute to which a person included in the still image belongs; and counting, for each of the appearance attributes, the number of persons belonging to the appearance attribute in the still image by using the analysis information, and generating counting information indicating a result of the counting in units of the still images.

One aspect of the present invention provides a program for causing a computer to execute:

acquiring analysis information being information acquired by analyzing a still image and including an appearance attribute to which a person included in the still image belongs; and counting, for each of the appearance attributes, the number of persons belonging to the appearance attribute in the still image by using the analysis information, and generating counting information indicating a result of the counting in units of the still images.

One aspect of the present invention provides an image analysis apparatus including:

an analysis result acquisition means for acquiring analysis information being information acquired by analyzing a plurality of images and including an appearance attribute for each person included in the plurality of images; and a counting means for counting, for each of the appearance attributes, the number of persons belonging to the appearance attribute in the plurality of images by using the analysis information, and generating counting information indicating a result of the counting.

One aspect of the present invention provides an image analysis method including, by a computer:

acquiring analysis information being information acquired by analyzing a plurality of images and including an appearance attribute for each person included in the plurality of images; and counting, for each of the appearance attributes, the number of persons belonging to the appearance attribute in the plurality of images by using the analysis information, and generating counting information indicating a result of the counting.

One aspect of the present invention provides a program for causing a computer to execute:

acquiring analysis information being information acquired by analyzing a plurality of images and including an appearance attribute for each person included in the plurality of images; and counting, for each of the appearance attributes, the number of persons belonging to the appearance attribute in the plurality of images by using the analysis information, and generating counting information indicating a result of the counting.

One aspect of the present invention provides an image analysis apparatus including:

an analysis result acquisition means for acquiring analysis information being information acquired by analyzing a plurality of images and including an appearance attribute for each person included in the plurality of images; and a counting means for counting the number of persons belonging to a combination of a plurality of appearance attributes by using the analysis information, and generating counting information indicating a result of the counting.

One aspect of the present invention provides an image analysis method including, by a computer:

acquiring analysis information being information acquired by analyzing a plurality of images and including an appearance attribute for each person included in the plurality of images; and counting the number of persons belonging to a combination of a plurality of appearance attributes by using the analysis information, and generating counting information indicating a result of the counting.

One aspect of the present invention provides a program for causing a computer to execute:

acquiring analysis information being information acquired by analyzing a plurality of images and including an appearance attribute for each person included in the plurality of images; and counting the number of persons belonging to a combination of a plurality of appearance attributes by using the analysis information, and generating counting information indicating a result of the counting.

According to one aspect of the present invention, it is possible to utilize a result of analyzing an image.

BRIEF DESCRIPTION OF THE DRAWINGS

FIG. 6 is an exemplary diagram illustrating a configuration of analysis information.

FIG. 8 is an exemplary diagram illustrating a physical configuration of the image analysis apparatus according to the example embodiment 1.

FIG. 11 is a diagram illustrating one example of a first screen SC1.

FIG. 12 is a diagram illustrating one example of a second screen SC2.

FIG. 13 is a diagram illustrating one example of a third screen SC3.

FIG. 14 is a diagram illustrating one example of a fourth screen SC4.

EXAMPLE EMBODIMENT

Hereinafter, example embodiments of the present invention will be described by using drawings. Note that, in all of the drawings, a similar component has a similar reference sign, and description thereof will be appropriately omitted.

Example Embodiment 1

Figure 1:
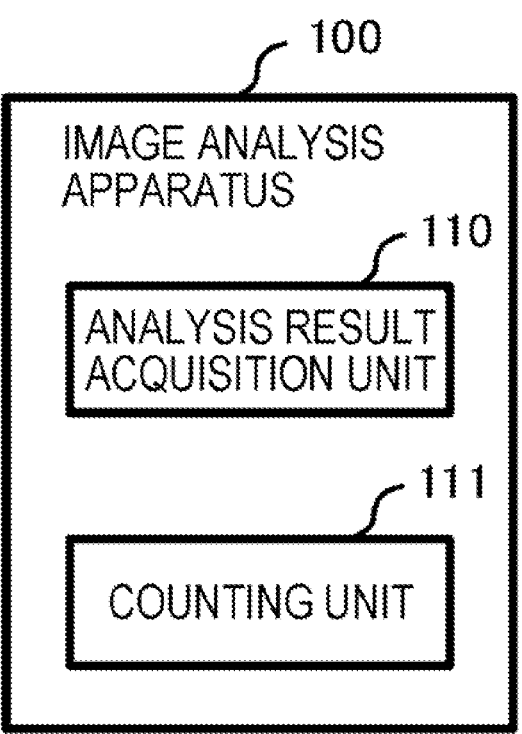
FIG. 1 is a diagram illustrating an overview of an image analysis apparatus according to an example embodiment 1.

FIG. 1 is a diagram illustrating an overview of an image analysis apparatus 100 according to an example embodiment 1. The image analysis apparatus 100 includes an analysis result acquisition unit 110 and a counting unit 111.

The analysis result acquisition unit 110 acquires analysis information being information acquired by analyzing a still image and including an appearance attribute to which a person included in the still image belongs. The counting unit 111 counts, for each appearance attribute, the number of persons belonging to the appearance attribute in the still image by using the analysis information, and generates counting information indicating a result of the counting in units of still images.

According to the image analysis apparatus 100, a result of analyzing the image can be utilized.

Figure 2:
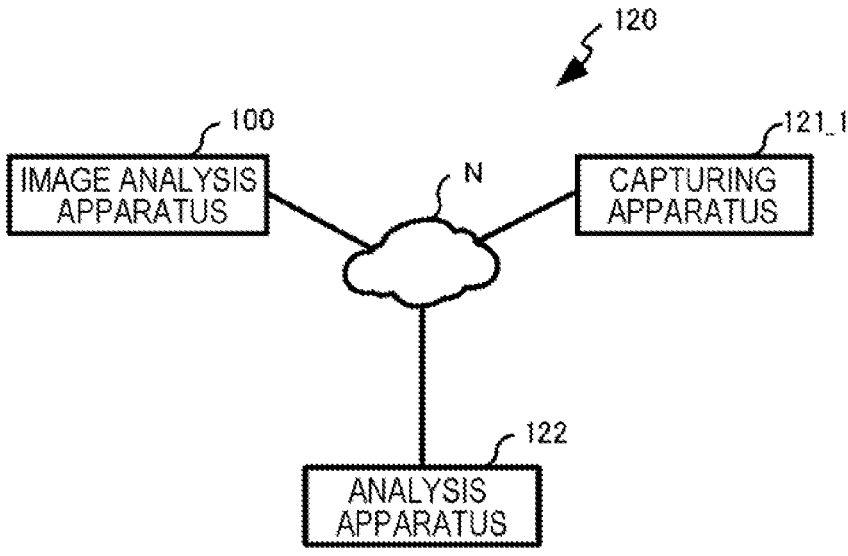
FIG. 2 is a diagram illustrating an overview of an image analysis system according to the example embodiment 1.

FIG. 2 is a diagram illustrating an overview of an image analysis system 120 according to the example embodiment 1. The image analysis system 120 includes the image analysis apparatus 100, at least one capturing apparatus 121_1, and an analysis apparatus 122.

The capturing apparatus 121_1 is an apparatus for generating a still image. The analysis apparatus 122 analyzes a still image by using a plurality of types of engines.

According to the image analysis system 120, the result of analyzing the image can be utilized.

Figure 3:
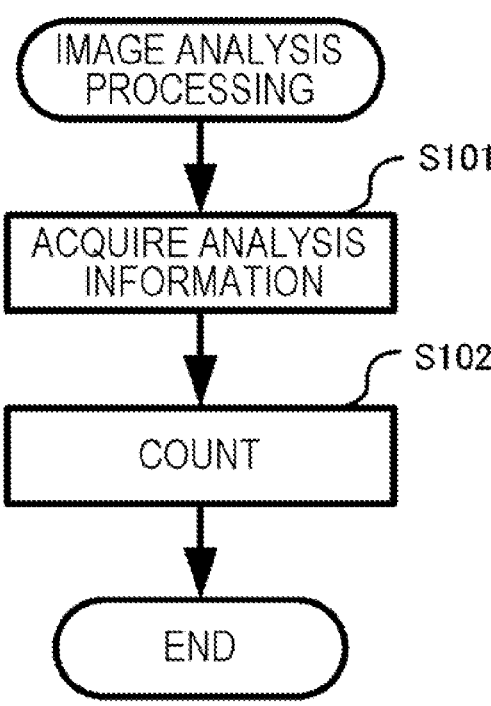
FIG. 3 is a flowchart illustrating one example of image analysis processing according to the example embodiment 1.

FIG. 3 is a flowchart illustrating one example of image analysis processing according to the example embodiment 1.

The analysis result acquisition unit 110 acquires analysis information being information acquired by analyzing a still image and including an appearance attribute to which a person included in the still image belongs (step S101).

The counting unit 111 counts, for each of the appearance attributes, the number of persons belonging to the appearance attribute in the still image by using the analysis information, and generates counting information indicating a result of the counting in units of still images (step S102).

According to this image analysis processing, the result of analyzing the image can be utilized.

Hereinafter, a detailed example of the image analysis system 120 according to the example embodiment 1 will be described.

Figure 4:
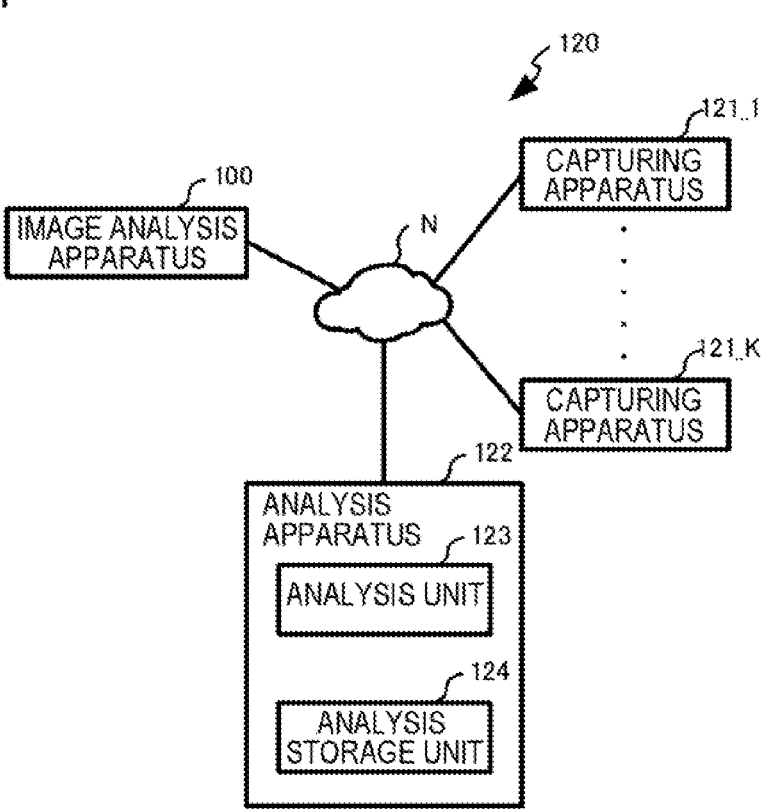
FIG. 4 is a diagram illustrating a detailed example of a configuration of the image analysis system according to the example embodiment 1.

FIG. 4 is a diagram illustrating a detailed example of the configuration of the image analysis system 120 according to the present example embodiment.

The image analysis system 120 includes the image analysis apparatus 100, K capturing apparatuses 121_1 to 121_K including the capturing apparatus 121_1, and the analysis apparatus 122. Herein, K is an integer of 1 or more.

The image analysis apparatus 100, each of the capturing apparatuses 121_1 to 121_K, and the analysis apparatus 122 are connected to one another via a communication network N being configured in a wired manner, a wireless manner, or in combination of such manners. The image analysis apparatus 100, each of the capturing apparatuses 121_1 to 121_K, and the analysis apparatus 122 transmit and receive information to and from one another via the communication network N.

(Configuration of Capturing Apparatuses 121_1 to 121_K)

The capturing apparatuses 121_1 to 121_K are, for example, cameras installed to capture a predetermined capturing region within a predetermined range. The predetermined range may be a building, a facility, a municipality, a prefecture, or the like, and may be a range appropriately determined among such places. The capturing regions of each of the capturing apparatuses 121_1 to 121_K may partially overlap one another, or may be regions different from one another.

Each of the capturing apparatuses 121_1 to 121_K generates a moving image by capturing a capturing region. Each of the capturing apparatuses 121_2 to 121_K transmits the generated moving image to the analysis apparatus 122 via the communication network N, for example, in real time.

The moving images generated by the capturing apparatuses 121_1 to 121_K are constituted of, for example, time-series still images captured at a predetermined frame rate. That is, the still image according to the present example embodiment is, for example, one of images constituting a moving image (that is, a frame image). Therefore, each of the capturing apparatuses 121_1 to 121_K is able to generate a still image by capturing the capturing region.

(Function of Analysis Apparatus 122)

The analysis apparatus 122 analyzes a plurality of images (moving images or still images) generated by each of the capturing apparatuses 121_1 to 121_K. The analysis apparatus 122 according to the present example embodiment analyzes each of the plurality of still images generated by each of the capturing apparatuses 121_1 to 121_K. As illustrated in FIG. 4, the analysis apparatus 122 includes an analysis unit 123 and an analysis storage unit 124.

Specifically, the analysis unit 123 acquires a plurality of pieces of image information 124a from each of the capturing apparatuses 121_1 to 121_K, and stores the acquired plurality of pieces of image information 124a in the analysis storage unit 124. The analysis unit 123 analyzes a plurality of images (for example, still images) indicated in each of the acquired plurality of pieces of image information 124a. The analysis unit 123 generates analysis information 124b indicating a result of analyzing a plurality of images, and stores the analysis information 124b in the analysis storage unit 124. The analysis unit 123 transmits the plurality of pieces of image information 124a and the analysis information 124b to the image analysis apparatus 100 via the communication network N.

The analysis unit 123 analyzes each of a plurality of images (for example, still images) by using a plurality of types of engines. Each of the engines has a function of analyzing an image and detecting a person included in the image, and thereby acquiring an appearance attribute or the like to which the person belongs.

The appearance attribute is an attribute on the appearance of a person. Appearance attributes include, for example, one or more of age group, gender, type and color of clothing, type and color of shoes, hairstyle, wearing or not wearing of hats, wearing or not wearing of ties, wearing or not wearing of eyeglasses, carrying or not carrying of umbrellas, using or not using of umbrellas, and the like.

Examples of engine types include (1) an object detection engine, (2) a face analysis engine, (3) a human figure analysis engine, (4) a pose analysis engine, (5) a behavior analysis engine, (6) an appearance attribute analysis engine, (7) a gradient feature analysis engine, (8) a color feature analysis engine, and (9) a line-of-flow analysis engine. The analysis unit 123 may include at least two engines of the types illustrated herein and of other types. The analysis unit 123 acquires appearance attributes by using the appearance attribute analysis engine or a plurality of types of engines.

(1) The object detection engine detects a person and an object from an image. The object detection engine may also determine the position of the person and the object in the image. An example of a model applied to the object detecting processing is YOLO (You Only Look Once).

(2) The face analysis engine performs detection of a face of a person from an image, extraction of a feature value (face feature value) of the detected face, classification of the detected face, and the like. The face analysis engine may also determine the position of the face in the image. The face analysis engine may also determine the identity of a person detected from different images, based on the similarity between the face feature values of the person detected from the different images and the like.

(3) The human figure analysis engine performs extraction of a human body feature value (for example, a value indicating an overall feature such as thick/thin body figure, height, and clothing) of a person included in an image, classification of a person included in the image, and the like. The human figure analysis engine may also determine the position of the person within the image. The human figure analysis engine may also determine the identity of a person included in a different image, based on a human body feature value of the person included in the different image or the like.

(4) The pose analysis engine generates pose information indicating a pose of a person. The pose information includes, for example, a pose estimation model of a person. The pose estimation model is a model in which joints of a person estimated from an image is connected. The pose estimation model includes a plurality of model elements corresponding to, for example, a joint element corresponding to a joint, a trunk element corresponding to a torso, a bone element corresponding to a bone connecting joints, and the like. The pose analysis function, for example, detects joint points of a person from an image and generates a pose estimation model by connecting the joint points.

Then, the pose analysis engine performs estimation of the pose of the person by using the information of the pose estimation model, extraction of the feature value (pose feature value) of the estimated pose, classification of the person included in the image, and the like. The pose analysis engine may also determine the identity of a person included in a different image, based on the pose feature value of the person included in the different image or the like.

For example, the techniques disclosed in PTL 2 and NPL 1 can be applied to the pose analysis engine.

(5) The behavior analysis engine is able to perform estimation of a motion of a person by using information of a pose estimation model, a change in a pose, and the like, extraction of a feature value (motion feature value) of a motion of the person, classification of a person included in an image, and the like. In the behavior analysis engine, the height of the person may be estimated or the position of the person in the image may be determined by using information of a stick figure model. The behavior analysis engine may estimate a behavior such as a change or transition of a pose, a movement (change or transition of a position) from an image, and extract a motion feature value related to the behavior, for example.

(6) The appearance attribute analysis engine is able to recognize appearance attributes associated with a person.

The appearance attribute analysis engine performs extraction of a feature value (appearance attribute feature value) related to the recognized appearance attribute, classification of a person included in an image, and the like.

(7) The gradient feature analysis engine extracts a feature value (gradient feature value) of the gradient in an image. For example, a technique such as SIFT, SURF, RIFF, ORB, BRISK, CARD, or HOG can be applied to the gradient feature analysis engine.

(8) The color feature analysis engine is able to perform detection of an object from an image, extraction of a feature value (color feature value) of the color of the detected object, classification of the detected object, and the like. The color feature value is, for example, a color histogram or the like. The color feature analysis engine may detect, for example, a person or an object included in an image.

(9) The line-of-flow analysis engine is able to determine a line of flow (a trajectory of movement) of a person included in a moving image by using, for example, a result of determination of identity performed by any one or more of the above-described engines. Specifically, for example, a person determined to be the same among images being different in time series is connected, in such a way that a line of flow of the person can be acquired. Further, for example, the line-of-flow analysis engine may determine a movement feature value indicating a movement direction and a movement velocity of the person. The moving feature value may be any one of a movement direction and a movement velocity of the person.

In a case where a moving image generated by a plurality of capturing apparatuses 121_2 to 121_K that capture different capturing regions is acquired, the line-of-flow analysis engine may also acquire a line of flow over a plurality of images acquired by capturing different capturing regions.

Each of the engines (1) to (9) may use the results of analysis performed by another engine as appropriate. The analysis unit 123 may include a function (analysis function) of analyzing an image by using the plurality of engines described above to acquire an age group, a gender, and the like.

Further, the engines (1) to (9) may acquire the reliability of the feature values acquired by the respective engines.

Note that the image analysis apparatus 100 may include an analysis unit having a function of the analysis apparatus 122.

The analysis storage unit 124 is a storage unit for storing various kinds of information such as the image information 124a and the analysis information 124b.

Figure 5:
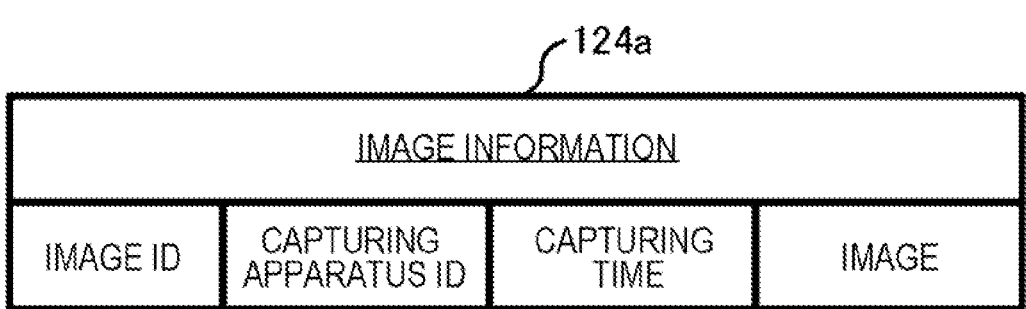
FIG. 5 is an exemplary diagram illustrating a configuration of image information.

The image information 124a is information indicating each of a plurality of images. FIG. 5 is a diagram illustrating a configuration example of the image information 124a. The image information 124a associates, for example, an image ID, a capturing apparatus ID, a capturing time, and an image to one another. This image may be either a moving image or a still image, but is a still image in the present example embodiment.

The image ID is information (image discrimination information) for discriminating each image (for example, a still image). The capturing apparatus ID is information (capturing discrimination information) for discriminating each of the capturing apparatuses 121_1 to 121_K. The capturing time is information indicating the time at which the capturing was performed. The capturing time includes, for example, a date and a time.

In the image information 124a, an image ID and an image discriminated by using the image ID are associated with each other. Further, in the image information 124a, a capturing apparatus ID for discriminating the capturing apparatuses 121_1 to 121_K that have generated the image discriminated by using the image ID and a capturing time indicating a time at which the image indicated by the image ID is generated (that is, a time at which capturing of the capturing region is performed) are associated with each other.

FIG. 6 is a diagram illustrating a configuration example of the analysis information 124b. The analysis information 124b associates the image ID, the capturing apparatus ID, the capturing time, and the analysis result to one another.

The image ID, the capturing apparatus ID, and the capturing time associated with the analysis information 124b are the same as the image ID, the capturing apparatus ID, and the capturing time associated with the image information 124a, respectively.

The analysis result is information indicating a result of analyzing the image discriminated by using the image ID associated with the analysis result. In the analysis information 124b, an image ID for discriminating an image to be analyzed in order to acquire the analysis result is associated with the analysis result.

The analysis result associates, for example, a human ID, a person ID, a position, an appearance attribute, and a reliability to one another.

The human ID is information (human image discrimination information) for discriminating each image associated with a person included in each image. In the analysis information 124b, the image ID and the human ID associated with the image (person image) of the person included in the image discriminated by using the image ID are associated with each other.

The person ID is information (person image discrimination information) for discriminating each person included in each image. When images of the same person are included in a plurality of images, the same person ID is assigned to the same person in the plurality of images. In the analysis information 124b, the image ID and the person ID related to the person included in the image discriminated by using the image ID are associated with each other.

The position is information indicating a position of a person image discriminated by using the human ID associated with the position. This position indicates the position in the image discriminated by using the image ID associated therewith.

The appearance attribute indicates an appearance attribute to which a person belongs. In the analysis information 124b, the human ID and the appearance attribute related to the person image discriminated by using the human ID are associated with each other.

The reliability indicates the reliability of the appearance attribute. In the analysis information 124b, the reliability indicates the reliability of the appearance attribute associated therewith.

(Function of Image Analysis Apparatus 100)

Figure 7:
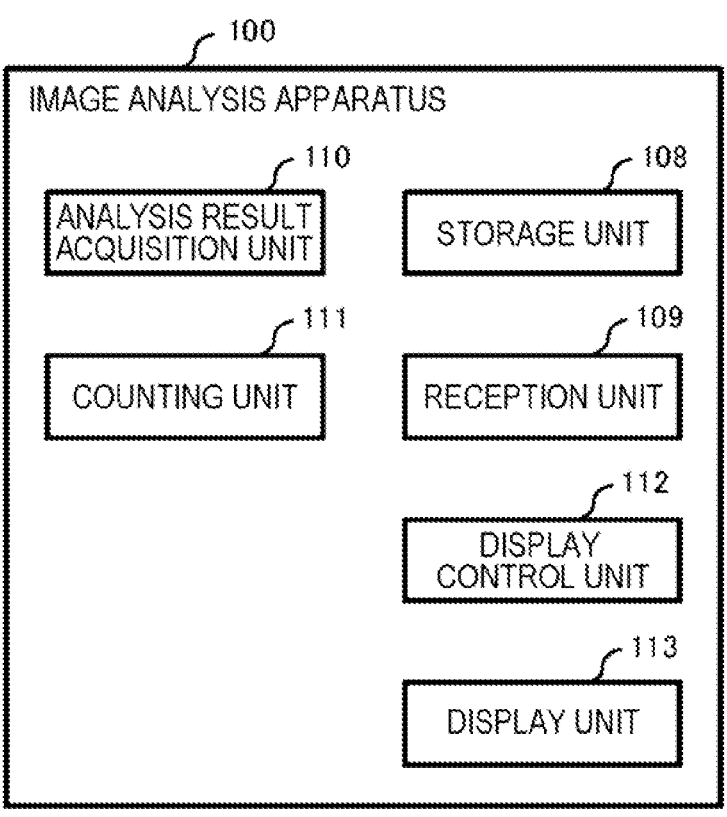
FIG. 7 is a diagram illustrating a detailed example of a functional configuration of the image analysis apparatus according to the example embodiment 1.

FIG. 7 is a diagram illustrating a detailed example of a functional configuration of the image analysis apparatus 100 according to the present example embodiment. The image analysis apparatus 100 includes a storage unit 108, a reception unit 109, an analysis result acquisition unit 110, a counting unit 111, a display control unit 112, and a display unit 113. Note that, the image analysis apparatus 100 may include the analysis unit 123 as described above, and in this case, the image analysis system 120 may not include the analysis apparatus 122.

The storage unit 108 is a storage unit for storing various kinds of information.

The reception unit 109 receives various kinds of information such as the image information 124*a* and the analysis information 124*b* from the analysis apparatus 122 via the communication network N. The reception unit 109 may receive the image information 124*a* and the analysis information 124*b* from the analysis apparatus 122 in real time, or may receive such information as necessary, for example, when such information is used in processing performed by the image analysis apparatus 100.

The reception unit 109 causes the storage unit 108 to store the received information. That is, the information stored in the storage unit 108 in the present example embodiment includes the image information 124*a* and the analysis information 124*b*.

Note that, the reception unit 109 may receive the image information 124*a* from the capturing apparatuses 121_1 to 121_K via the communication network N, and store the received information in the storage unit 108. In addition, the reception unit 109 may receive the image information 124*a* and the analysis information 124*b* from the analysis apparatus 122 via the communication network N as necessary, for example, when such information is used in processing performed by the image analysis apparatus 100. In this case, the image information 124*a* and the analysis information 124*b* may not be stored in the storage unit 108. Further, for example, when the reception unit 109 receives all of the image information 124*a* and the analysis information 124*b* from the analysis apparatus 122 and stores such information in the storage unit 108, the analysis apparatus 122 may not hold the image information 124*a* and the analysis information 124*b*.

The analysis result acquisition unit 110 acquires, from storage unit 108, analysis information 124*b* indicating a result of analysis performed by the analysis unit 123 for each of the plurality of images by using a plurality of types of engines. Note that, the analysis result acquisition unit 110 may receive the analysis information 124*b* from the analysis apparatus 122 via the communication network N. The analysis information 124*b* is information acquired by analyzing a still image and includes an appearance attribute to which a person included in the still image belongs.

The counting unit 111 counts, for each appearance attribute, the number of persons belonging to the appearance attribute in each of the plurality of images by using the analysis information 124*b*, and generates counting information indicating a result of the counting in units of images.

The counting unit 111 may count, for each appearance attribute, the number of persons belonging to the appearance attribute in the still image by using a reliability threshold and the analysis information 124*b*, and generate counting information indicating a result of the counting. The reliability threshold is a value set for the reliability. When the reliability threshold is set, the counting unit 111 counts, for example, the number of persons belonging to the appearance attribute in the still image for each appearance attribute by using the analysis information 124*b* associating the reliability that is equal to or greater than the reliability threshold.

The display control unit 112 causes the display unit 113 to display various kinds of information. The display control unit 112 causes the display unit 113 to display a still image, a moving image, counting information, and the like. When causing the display unit 113 to display a moving image, the display control unit 112 causes the display unit 113 to display still images in chronological order.

As the still image or moving image to be displayed on the display unit 113 by the display control unit 112, for example, any one or a plurality of the capturing apparatuses 121_1 to

121_K that generate the still image or the moving image may be specified based on an input from a user. When a plurality of capturing apparatuses 121_1 to 121_K are specified, the still image or the moving image generated by capturing performed by each of the capturing apparatuses 121_1 to 121_K may be displayed on the display unit 113 simultaneously, for example.

(Physical Configuration of Image Analysis Apparatus 100)

FIG. 8 is a diagram illustrating a physical configuration example of the image analysis apparatus 100 according to the present example embodiment. The image analysis apparatus 100 includes a bus 1010, a processor 1020, a memory 1030, a storage device 1040, a network interface 1050, and a user interface 1060.

The bus 1010 is a data transmission path through which the processor 1020, the memory 1030, the storage device 1040, the network interface 1050, and the user interface 1060 transmit and receive data to and from one another. However, the method of connecting the processor 1020 and the like to one another is not limited to a bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SDD), a memory card, a read only memory (ROM), or the like. The storage device 1040 stores program modules for achieving the functions of the image analysis apparatus 100. The processor 1020 reads the program modules into the memory 1030 and executes the program modules, thereby achieving functions corresponding to the program modules.

The network interface 1050 is an interface for connecting the image analysis apparatus 100 to the communication network N.

The user interface 1060 is a touch panel, a keyboard, a mouse, or the like as an interface for the user to input information, and a liquid crystal panel, an organic electroluminescence (EL) panel, or the like as an interface for providing information to the user.

The analysis apparatus 122 may be physically configured in a manner similar to that of the image analysis apparatus 100 (see FIG. 8). Therefore, a diagram illustrating the physical configuration of the analysis apparatus 122 is omitted.

(Operation of Image Analysis System 120)

The operation of the image analysis system 120 will now be described with reference to the drawings.

(Analysis Processing)

Figure 9:
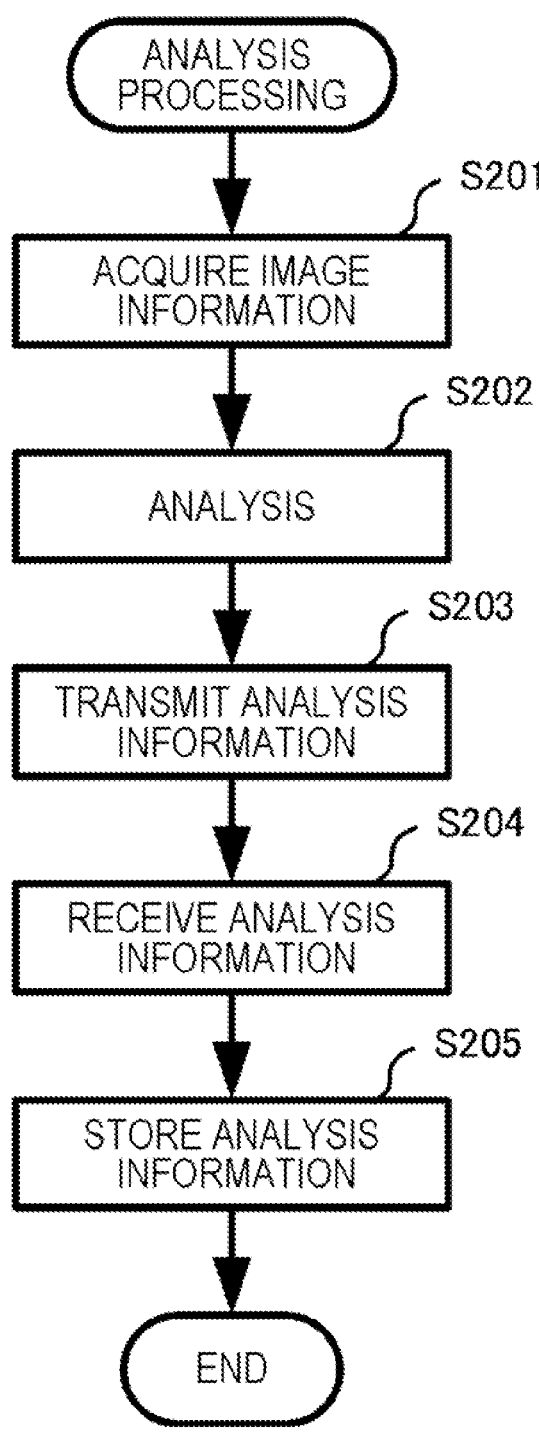
FIG. 9 is a flowchart illustrating one example of analysis processing according to the example embodiment 1.

FIG. 9 is a flowchart illustrating one example of analysis processing according to the present example embodiment. The analysis processing is processing for analyzing the images generated by the capturing apparatuses 121_1 to 121_K. The analysis processing is repeatedly executed, for example, during the operation of the capturing apparatuses 121_1 to 121_K and the analysis unit 123.

The analysis unit 123 acquires the image information 124*a* from each of the capturing apparatuses 121_1 to 121_K, for example, in real time via the communication network N (step S201).

The analysis unit 123 causes the analysis storage unit 124 to store the image information 124*a* acquired in step S201, and analyzes the image indicated by the image information 124*a* (step S202).

For example, as described above, the analysis unit 123 analyzes an image by using a plurality of types of engines to detect a detection target. Further, the analysis unit 123 acquires the appearance feature value of the detected detection target and the reliability of the appearance feature value by using various types of engines. The analysis unit 123 generates the analysis information 124*b* by performing such analysis.

At this time, for example, the analysis unit 123 may analyze each of all the still images included in the image information 124*a* acquired in step S201. Further, for example, the analysis unit 123 may analyze each of a part of the still images included in the image information 124*a* acquired in step S201, such as each of the still images captured at regular time intervals.

The analysis unit 123 causes the analysis storage unit 124 to store the analysis information 124*b* generated by performing the analysis in step S202, and transmits the analysis information 124*b* to the image analysis apparatus 100 via the communication network N (step S203). At this time, the analysis unit 123 may transmit the image information 124*a* acquired in step S201 to the image analysis apparatus 100 via the communication network N.

The reception unit 109 receives the analysis information 124*b* transmitted in step S203 via the communication network N (step S204). At this time, the reception unit 109 may receive the image information 124*a* transmitted in step S203 via the communication network N.

The reception unit 109 causes the storage unit 108 to store the analysis information 124*b* received in step S204 (step S205), and ends the analysis processing. At this time, the reception unit 109 may receive the image information 124*a* received in step S204 via the communication network N.

Note that, the analysis unit 123 may perform analysis on a moving image specified by the user, for example. In this case, for example, the moving image captured by each of the capturing apparatuses 121_1 to 121_K may be stored in the analysis storage unit 124. Then, the analysis unit 123 may acquire, from the analysis storage unit 124, a moving image specified by using one or more of a target period, a capturing apparatus, and the like, and analyze each of all the still images or a part of the still images constituting the acquired moving image. In this case as well, the analysis unit 123 may generate the analysis information 124*b* as the analysis result and store the analysis information 124*b* in the analysis storage unit 124.

(Image Analysis Processing)

The image analysis processing is processing for counting the number of persons included in the image as described with reference to FIG. 3. The image analysis processing is started when the analysis result acquisition unit 110 acquires, for example, a target period, a capturing apparatus, and a reliability threshold specified based on an input from a user. For example, the capturing apparatus is specified by using an capturing apparatus ID related to any one of the capturing apparatuses 121_1 to 121_K. In a case where a single still image is specified, the target period is a capturing time.

Figure 10:
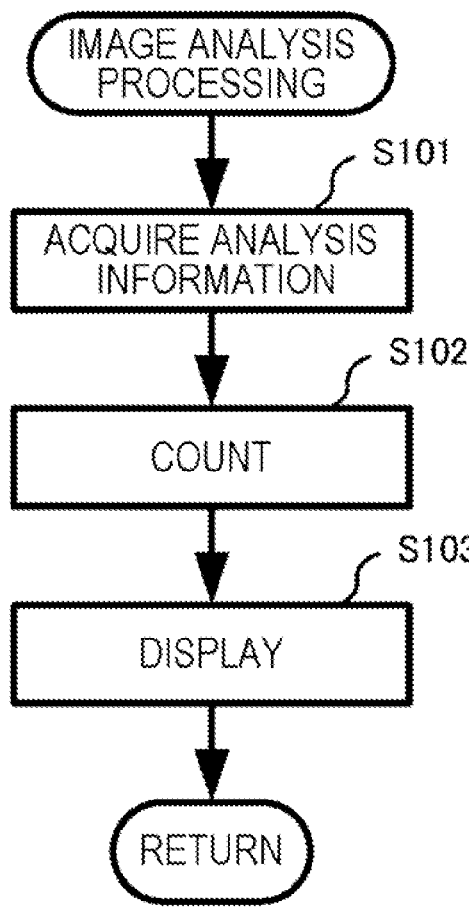
FIG. 10 is a flowchart illustrating a detailed example of image analysis processing according to the example embodiment 1.

FIG. 10 is a flowchart illustrating a detailed example of the image analysis processing according to the present example embodiment.

The analysis result acquisition unit 110 acquires the analysis information 124*b* from the storage unit 108 (step S101).

Specifically, for example, the analysis result acquisition unit 110 acquires, from the storage unit 108, analysis information 124*b* according to the specified target period, the capturing apparatus, and the reliability threshold. The analysis information 124*b* according to the specified target period, the capturing apparatus, and the reliability threshold is analysis information 124*b* in which the capturing time included in the target period, the specified capturing apparatuses 121_1 to 121_K, and the reliability equal to or higher than the reliability threshold are associated with one another.

The counting unit 111 counts, for each appearance attribute, the number of persons belonging to the appearance attribute in each of the still images by using the analysis information 124*b* acquired in step S101 (step S102). Then, the counting unit 111 generates counting information indicating a result of the counting for each appearance attribute in units of still images.

Specifically, for example, the counting unit 111 counts the number of human IDs associated with the same appearance attribute for each still image with respect to the analysis information 124*b* acquired in step S101. Then, the counting unit 111 generates counting information indicating a result of the counting for each still image and for each appearance attribute.

The display control unit 112 causes the display unit 113 to display the counting information associated with the still image together with the still image (step S103).

FIG. 11 is one example of a first screen SC1 that displays counting information together with a still image. The image (still image) included in the first screen SC1 illustrated in FIG. 11 includes three person images. The first screen SC1 includes counting information indicating a result of counting with respect to the appearance attributes of the three person images. The counting information included in the first screen SC1 illustrated in FIG. 11 indicates, for example, that the three person images include two males and one female.

When displaying a moving image on the display unit 113, the display control unit 112 causes the display unit 113 to display each of the still images constituting the moving image together with counting information associated with the still images. Specifically, for example, the display control unit 112 causes the display unit 113 to display a still image in time series and also display counting information associated with the still image being displayed. That is, when the still image being displayed is switched, the counting information displayed together with the still image is also switched.

Further, the display control unit 112 causes the display unit 113 to display, on the first screen SC1, each of the appearance attributes in a selectable manner. For example, upon receiving a selection of any one or a plurality of appearance attributes, based on an input from a user, the display control unit 112 causes the display unit 113 to display additional information indicating a person belonging to the selected appearance attribute in such a manner that the additional information is superimposed on the still image. In this case, the display control unit 112 causes the display unit 113 to display the reliability of the appearance attribute of the person belonging to the selected appearance attribute among the persons included in the still image.

Figure 12:
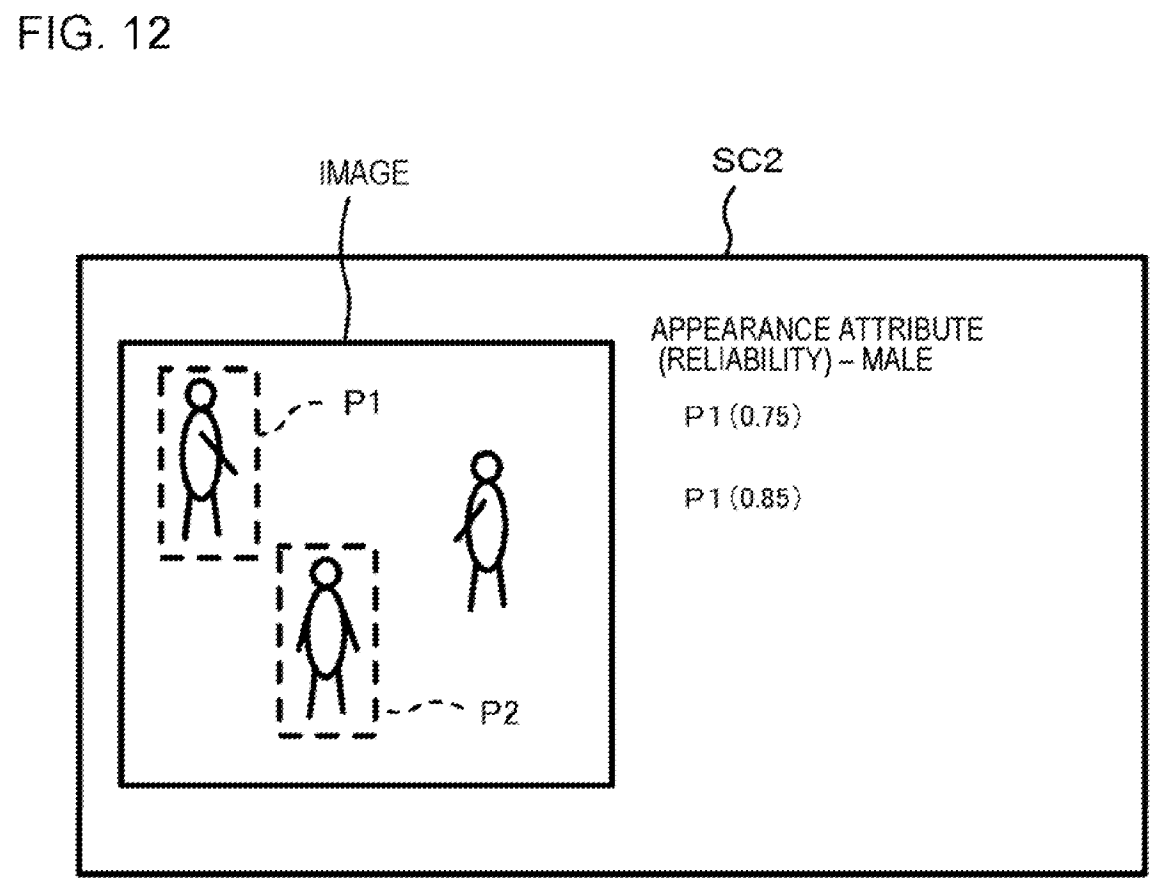

FIG. 12 is one example of a second screen SC2 to be displayed when [Male], being one of the appearance attributes, is selected. FIG. 12 illustrates an example in which additional information indicating a person belonging to the selected appearance attribute is a dotted-line frame surrounding an image (a person image) indicating such person. In addition, FIG. 12 illustrates an example in which the additional information further includes [P1] and [P2] which are human IDs of such person. Furthermore, FIG. 12 illustrates an example in which the reliability of [P1] and [P2] each being a [Male] is [0.75] and [0.85], respectively.

(Advantageous Effect)

As described above, according to the present example embodiment, the image analysis apparatus 100 includes the analysis result acquisition unit 110 and the counting unit 111. The analysis result acquisition unit 110 acquires analysis information 124*b* being information acquired by analyzing a still image and including appearance attributes to which a person included in the still image belongs. The counting unit 111 counts, for each appearance attribute, the number of persons belonging to the appearance attribute in the still image by using the analysis information 124*b*, and generates counting information indicating a result of the counting.

As a result, it is possible to acquire information acquired by counting, for each appearance attribute, the number of persons belonging to the appearance attribute in an image. Therefore, the result of analyzing the image can be utilized.

According to the present example embodiment, the image analysis apparatus 100 further includes the display control unit 112 that causes the display unit 113 to display, together with the still image, counting information associated with the still image.

Accordingly, the user can refer to the counting information together with the still image. Therefore, the result of analyzing the image can be utilized.

According to the present example embodiment, a still image is one of the images constituting a moving image. The display control unit 112 causes the display unit 113 to display, together with each of the still images constituting the moving image, counting information associated with the still image.

As a result, the user can refer to the counting information together with each of the still images constituting the moving image. Therefore, the result of analyzing the image can be utilized.

According to the present example embodiment, upon receiving the selection of the appearance attribute, the display control unit 112 causes the display unit 113 to display the additional information indicating the person belonging to the selected appearance attribute in such a manner that the additional information is superimposed on the still image.

As a result, the user can easily confirm the person belonging to the desired appearance attribute in the image. Therefore, the result of analyzing the image can be utilized.

According to the present example embodiment, the analysis information 124*b* includes the reliability for each of the appearance attributes. The display control unit 112 causes the display unit 113 to display the reliability of the selected appearance attribute of the person belonging to the selected appearance attribute.

As a result, the user can easily confirm the reliability of the appearance attribute acquired by analyzing the image. Therefore, the result of analyzing the image can be utilized.

According to the present example embodiment, the analysis information 124*b* includes the reliability for each of the appearance attributes. The counting unit 111 counts, for each appearance attribute, the number of persons belonging to the appearance attribute in the still image by using the reliability threshold set for the reliability and the analysis information 124*b*, and generates counting information indicating a result of the counting.

As a result, the user can acquire information acquired by counting, for each appearance attribute, the number of persons belonging to the appearance attribute having a reliability according to the reliability threshold. Therefore, the result of analyzing the image can be utilized.

Example Embodiment 2

In the example embodiment 1, an example has been described in which the number of person images belonging to each appearance attribute is counted with respect to a still image. For a plurality of images (moving images or still images), the number of persons belonging to each appearance attribute may be counted by counting the same person indicated by the person image as a single person. In the example embodiment 2, an example will be described in which the number of persons belonging to each appearance attribute is counted for a plurality of images.

Also, in the present example embodiment, an image analysis system 120 may be configured functionally and physically substantially similar to the example embodiment 1 (see FIGS. 1 to 8). In the present example embodiment, the operation of the image analysis system 120 may be substantially similar to that of the example embodiment 1 (see FIGS. 9 and 10). In the present example embodiment, different points from the example embodiment 1 are mainly described, and overlapping points with the example embodiment 1 are appropriately omitted for simplifying the description.

Refer to FIG. 1.

An analysis result acquisition unit 110 according to the present example embodiment acquires analysis information 124*b* being information acquired by analyzing a plurality of images and including an appearance attribute of each person included in the plurality of images. A counting unit 111 according to the present example embodiment counts, for each of the appearance attributes, the number of persons belonging to the appearance attribute in a plurality of images by using the analysis information 124*b*, and generates counting information indicating a result of the counting.

According to this image analysis apparatus 100, the result of analyzing the image can be utilized.

Note that, the analysis information 124*b* may be information indicating a result of analysis in units of still images, or information indicating a result of analysis in units of moving images. The result of the analysis in units of moving images may be an analysis result of all of the still images included in a moving image as a unit, or an analysis result of a part of the still images included in a moving image as a unit (for example, still images captured at regular time intervals).

Refer to FIG. 3.

The analysis result acquisition unit 110 acquires analysis information 124*b* being information acquired by analyzing a plurality of images and including an appearance attribute of each person included in the plurality of images (step S101).

The counting unit 111 counts, for each appearance attribute, the number of persons belonging to the appearance attribute in a plurality of images by using the analysis information 124*b*, and generates counting information indicating a result of the counting (step S102).

According to this image analysis processing, the result of analyzing the image can be utilized.

Herein, in a case where the analysis information 124*b* is information indicating a result of analysis in units of still images, the counting unit 111 may count the number of persons for each of the still images constituting the plurality of images (that is, in units of still images), and generate counting information indicating a result of counting in units of still images. As a result, it is possible to acquire detailed counting results in consideration of time series.

In the present example embodiment, in detail, for example, in step S102, the counting unit 111 counts the number of person IDs associated with the same appearance attribute with respect to the analysis information 124*b* acquired in step S101. Then, the counting unit 111 generates counting information indicating a result of the counting for each appearance attribute.

In step S103, a display control unit 112 may cause a display unit 113 to display the counting information generated in step S102.

Further, in step S103, the display control unit 112 may cause the display unit 113 to display the appearance attribute of each person included in the plurality of images by using the analysis information 124*b*.

FIG. 13 is one example of a third screen SC3 that displays appearance attributes of each person together with a still image. The image (still image) included in the third screen SC3 illustrated in FIG. 13 is one of a plurality of images used to acquire the analysis result included in the analysis information 124*b* acquired in step S101, and includes images of three persons. The third screen SC3 includes appearance attributes for each of the three persons.

The display control unit 112 causes the display unit 113 to display a person ID for discriminating each of the persons in a selectable manner. For example, the display control unit 112, upon receiving any one or a plurality of selections of the person IDs, based on an input from the user, causes the display unit 113 to display additional information indicating a person related to the selected person ID, in such a manner that the additional information is superimposed on the still image.

FIG. 14 is one example of a fourth screen SC4 to be displayed when [Person 1] being one of the person IDs of the persons illustrated in FIG. 13 is selected. FIG. 14 illustrates an example in which additional information indicating the selected person ID is a dotted-line frame surrounding an image (a person image) of the related person. Further, FIG. 14 illustrates an example in which the additional information further includes [Person 1] being the selected person ID.

(Advantageous Effect)

As described above, according to the present example embodiment, the image analysis apparatus 100 includes the analysis result acquisition unit 110 and the counting unit 111. The analysis result acquisition unit 110 acquires analysis information 124*b* being information acquired by analyzing a plurality of images and including an appearance attribute of each person included in the plurality of images. The counting unit 111 counts, for each of the appearance attributes, the number of persons belonging to the appearance attribute in the plurality of images by using the analysis information 124*b*, and generates counting information indicating a result of the counting.

As a result, it is possible to acquire information acquired by counting the number of persons belonging to an appearance attribute in a plurality of images for each appearance attribute. Therefore, the result of analyzing the image can be utilized.

According to the present example embodiment, the plurality of images are images acquired by capturing performed by a plurality of capturing apparatuses 121_1 to 121_K.

As a result, it is possible to acquire information of the number of persons belonging to an appearance attribute being counted for each appearance attribute, in a plurality of images acquired by capturing performed by the plurality of capturing apparatuses 121_1 to 121_K. Therefore, the result of analyzing the image can be utilized.

According to the present example embodiment, the image analysis apparatus 100 further includes the display control unit 112 that causes the display unit 113 to display appearance attributes of each person included in the plurality of images by using the analysis information 124*b*.

As a result, the user can easily confirm the appearance attribute of each person included in the image. Therefore, the result of analyzing the image can be utilized.

Example Embodiment 3

In the example embodiment 2, an example has been described in which the number of persons belonging to each appearance attribute is counted for a plurality of images. The appearance attribute the number of persons belonging thereto to be counted is not limited to one, and may be any combination of a plurality appearance attributes. In the example embodiment 3, an example will be described in which the number of persons belonging to a combination of a plurality of appearance attributes is counted for a plurality of images (moving images or still images).

Also, in the present example embodiment, an image analysis system 120 may be configured functionally and physically substantially similar to the example embodiment 1 (see FIGS. 1 to 8). In the present example embodiment, the operation of the image analysis system 120 may be substantially similar to that of the example embodiment 1 (see FIGS. 9 and 10). In the present example embodiment, different points from the example embodiment 1 are mainly described, and overlapping points with the example embodiment 1 are appropriately omitted for simplifying the description.

Refer to FIG. 1.

An analysis result acquisition unit 110 according to the present example embodiment acquires analysis information 124*b* being information acquired by analyzing a plurality of images and including an appearance attribute of each person included in the plurality of images. A counting unit 111 according to the present example embodiment counts the number of persons belonging to a combination of a plurality of appearance attributes by using the analysis information 124*b*, and generates counting information indicating a result of the counting.

According to this image analysis apparatus 100, the result of analyzing the image can be utilized.

Refer to FIG. 3.

The analysis result acquisition unit 110 acquires analysis information 124*b* being information acquired by analyzing a plurality of images and including appearance attributes of each person included in the plurality of images (step S101).

Note that, the analysis information 124*b* may be information indicating a result of analysis in units of still images, or information indicating a result of analysis in units of moving images. The result of the analysis in units of moving images may be an analysis result of all of the still images included in a moving image as a unit, or an analysis result of a part of the still images included in a moving image as a unit (for example, still images captured at regular time intervals).

The counting unit 111 counts the number of persons belonging to a combination of the plurality of appearance attributes by using the analysis information 124*b*, and generates counting information indicating a result of the counting (step S102).

According to this image analysis processing, the result of analyzing the image can be utilized.

In the present example embodiment, in detail, for example, in response to a user's selection relating to one or a plurality of combinations of the plurality of appearance attributes, the counting unit 111 may count the number of persons belonging to all of the plurality of appearance attributes constituting the combination for each combination of the plurality of appearance attributes selected by the user, by using the analysis information 124b. Further, the counting unit 111 may count, for each combination of all or a predetermined part of the plurality of appearance attributes included in the analysis information 124b, the number of persons belonging to all of the plurality of appearance attributes constituting the combination by using the analysis information 124b.

Then, the counting unit 111 generates counting information indicating a result of the counting. The counting information may be information in which combinations of a plurality of appearance attributes are arranged in descending order of the number of persons belonging to all of the plurality of appearance attributes.

The counting unit 111 may count, for each capturing condition, the number of persons belonging to the combination of the plurality of appearance attributes by using the analysis information 124b, and generate counting information indicating a result of the counting. The capturing conditions include, for example, at least one of weather, day of the week, time zone, season, and capturing apparatus.

As for the weather, for example, the counting unit 111 may acquire weather information according to the capturing time from an apparatus (not illustrated) that manages weather information relating to weather at each time. The season may be determined in advance for each month, for example, and the counting unit 111 may determine the season according to the month included in the capturing time.

In the present example embodiment, in detail, for example, in step S102, the counting unit 111 counts the number of person IDs associated with the same appearance attribute for the analysis information 124b acquired in step S101, as in the example embodiment 2. Then, the counting unit 111 generates counting information indicating a result of the counting for each appearance attribute.

Herein, in a case where the analysis information 124b is information indicating a result of analysis in units of still images, the counting unit 111 may count the number of persons for each of the still images constituting the plurality of images (that is, in units of still images), and generate counting information indicating a result of counting in units of still images. As a result, it is possible to acquire detailed counting results in consideration of time series.

In step S103, a display control unit 112 may cause a display unit 113 to display the counting information generated in step S102.

Further, the display control unit 112 may cause the display unit 113 to display information associated with a first combination, which is a combination of the plurality of appearance attributes having the largest number of persons belonging to the combination of the plurality of appearance attributes, based on the counting information generated in step S102. Information associated with the first combination may be represented by using line charts, bar charts, pie charts, etc.

Figure 15:
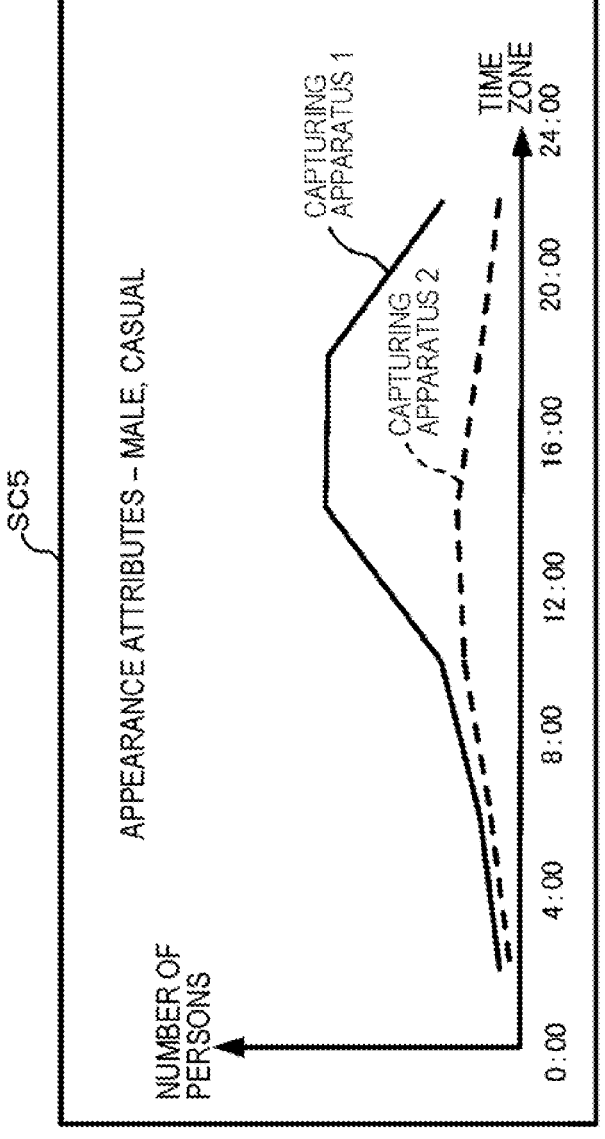
FIG. 15 is a diagram illustrating one example of a fifth screen SC5.

FIG. 15 is one example of a fifth screen SC5 that displays information associated with the first combination. FIG. 15 illustrates an example of the fifth screen SC5 when the first combination is [Male] and [Casual]. Further, FIG. 15 illustrates an example of the fifth screen SC5 in which the number of persons in each time zone is indicated by a line chart in each time zone.

(Advantageous Effect)

As described above, according to the present example embodiment, the image analysis apparatus 100 includes the analysis result acquisition unit 110 and the counting unit 111.

The analysis result acquisition unit 110 acquires the analysis information 124b being information acquired by analyzing a plurality of images and including an appearance attribute of each person included in the plurality of images. The counting unit 111 counts the number of persons belonging to the combination of the plurality of appearance attributes by using the analysis information 124b, and generates counting information indicating a result of the counting.

As a result, it is possible to acquire information acquired by counting the number of persons belonging to a combination of the plurality of appearance attributes in a plurality of images. Therefore, the result of analyzing the image can be utilized.

According to the present example embodiment, the analysis information 124b is information indicating a result of analyzing an image by using a plurality of types of engines for analyzing an image, and includes appearance attributes of a person included in the image.

As a result, it is possible to acquire information acquired by counting the number of persons belonging to a combination of a plurality of appearance attributes acquired by analyzing a plurality of images by using a plurality of types of engines. Therefore, the result of analyzing the image can be utilized.

According to the present example embodiment, the counting unit 111 counts, for each combination of the plurality of appearance attributes, the number of persons belonging to all of the plurality of appearance attributes constituting the combination, and generates counting information indicating a result of the counting.

As a result, it is possible to acquire information acquired by counting the number of persons belonging to a combination of a plurality of appearance attributes in a plurality of images. Therefore, the result of analyzing the image can be utilized.

According to the present example embodiment, the counting information is information acquired by arranging combinations of a plurality of appearance attributes in descending order of the number of persons belonging to all of the plurality of appearance attributes constituting the combination.

As a result, it is possible to acquire information in which combinations of a plurality of appearance attributes are arranged in descending order of the number of persons belonging to each combination. Therefore, the result of analyzing the image can be utilized.

According to the present example embodiment, the image analysis apparatus 100 further includes the display control unit 112 that displays, on the display unit 113, information associated with the first combination being a combination of the plurality of appearance attributes having the largest number of persons belonging to the combination of the plurality of appearance attributes, based on the counting information.

This allows the user to refer to the information associated with the first combination. Therefore, the result of analyzing the image can be utilized.

According to the present example embodiment, the counting unit 111 counts, for each capturing condition, the number of persons belonging to the combination of the plurality of appearance attributes by using the analysis information 124b, and generates counting information indicating a result of the counting.

Accordingly, it is possible to acquire information acquired by counting, for each capturing condition, the number of persons belonging to the combination of the plurality of appearance attributes in the plurality of images. Therefore, the result of analyzing the image can be utilized.

According to the present example embodiment, the capturing conditions include at least one of weather, day of the week, time zone, season, and capturing apparatus.

Accordingly, it is possible to acquire information acquired by counting the number of persons belonging to the combination of the plurality of appearance attributes in the plurality of images for at least one of weather, day of the week, time zone, season, and capturing apparatus. Therefore, the result of analyzing the image can be utilized.

While the example embodiments and the modification examples of the present invention have been described with reference to the drawings, the example embodiments and the modification examples are only exemplification of the present invention, and various configurations other than the above-described example embodiments and modification examples can also be employed.

Further, in the plurality of flowcharts used in the above description, a plurality of steps (processing) are described in order, but the execution order of the steps executed in the example embodiments is not limited to the described order. In the embodiment, the illustrated order of the steps can be changed to the extent that there is no problem in terms of content. Further, the above-described embodiments and modifications can be combined within a range where the contents do not conflict with each other.

A part or the whole of the above-described example embodiments may also be described as in supplementary notes below, which is not limited thereto.

1. An image analysis apparatus including:
   an analysis result acquisition means for acquiring analysis information being information acquired by analyzing a still image and including an appearance attribute to which a person included in the still image belongs; and
   a counting means for counting, for each of the appearance attributes, the number of persons belonging to the appearance attribute in the still image by using the analysis information, and generating counting information indicating a result of the counting in units of the still images.

2. The image analysis apparatus according to supplementary note 1, further including
   a display control means for causing a display means to display, in units of the still images, the still image together with counting information associated with the still image.

3. The image analysis apparatus according to supplementary note 1 or 2, wherein:
   the still image is one of images constituting a moving image; and
   the display control means causes the display means to display each of the still images constituting the moving image, together with counting information associated with the still image.

4. The image analysis apparatus according to any one of supplementary notes 1 to 3, wherein
   upon receiving selection of the appearance attribute, the display control means causes the display means to display additional information indicating a person belonging to the selected appearance attribute in such a way that the additional information is superimposed on the still image.

5. The image analysis apparatus according to any one of supplementary notes 1 to 4, wherein:
   the analysis information includes reliability for each of the appearance attributes; and the display control means causes the display means to display reliability of the appearance attribute of a person belonging to the selected appearance attribute.

6. The image analysis apparatus according to any one of supplementary notes 1 to 5, wherein:
   the analysis information includes reliability for each of the appearance attributes; and
   the counting means counts, for each of the appearance attributes, the number of persons belonging to the appearance attribute in the still image by using a reliability threshold set for the reliability and the analysis information, and generates counting information indicating a result of the counting.

7. An image analysis apparatus including:
   an analysis result acquisition means for acquiring analysis information being information acquired by analyzing a plurality of images and including an appearance attribute for each person included in the plurality of images; and
   a counting means for counting, for each of the appearance attributes, the number of persons belonging to the appearance attribute in the plurality of images by using the analysis information, and generating counting information indicating a result of the counting.

8. The image analysis apparatus according to supplementary note 7, wherein
   the plurality of images are images acquired by capturing performed by a plurality of capturing apparatuses.

9. The image analysis apparatus according to supplementary note 7 or 8, further including
   a display control means for causing a display means to display the appearance attribute for each person included in the plurality of images by using the analysis information.

10. An image analysis apparatus including:
   an analysis result acquisition means for acquiring analysis information being information acquired by analyzing a plurality of images and including an appearance attribute for each person included in the plurality of images; and
   a counting means for counting the number of persons belonging to a combination of a plurality of appearance attributes by using the analysis information, and generating counting information indicating a result of the counting.

11. The image analysis apparatus according to supplementary note 10, wherein
   the analysis information is information indicating a result of analyzing the image by using a plurality of types of engines for analyzing the image, and includes an appearance attribute of a person included in the image.

12. The image analysis apparatus according to supplementary note 10 or 11, wherein
   the counting means counts, for each combination of the plurality of appearance attributes, the number of persons belonging to all of the plurality of appearance attributes constituting the combination, and generates counting information indicating a result of the counting.

13. The image analysis apparatus according to supplementary note 12, wherein
   the counting information is information in which a combination of the plurality of appearance attributes is arranged in descending order of the number of persons belonging to all of the plurality of appearance attributes constituting the combination.

14. The image analysis apparatus according to supplementary note 12 or 13, further including a display control means for causing a display means to display information on a first combination being a combination of a plurality of appearance attributes having the largest number of persons belonging to a combination of the plurality of appearance attributes, based on the counting information.

15. The image analysis apparatus according to any one of supplementary notes 10 to 14, wherein the counting means counts, for each capturing condition, the number of persons belonging to a combination of a plurality of appearance attributes by using the analysis information, and generates counting information indicating a result of the counting.

16. The image analysis apparatus according to supplementary note 15, wherein the capturing condition includes at least one of weather, day of week, time zone, season, and capturing apparatus.

17. An image analysis method including, by a computer:

acquiring analysis information being information acquired by analyzing a still image and including an appearance attribute to which a person included in a still image belongs; and counting, for each of the appearance attributes, the number of persons belonging to the appearance attribute in the still image by using the analysis information, and generating counting information indicating a result of the counting in units of the still images.

18. A program for causing a computer to execute:

acquiring analysis information being information acquired by analyzing a still image and including an appearance attribute to which a person included in the still image belongs; and counting, for each of the appearance attributes, the number of persons belonging to the appearance attribute in the still image by using the analysis information, and generating counting information indicating a result of the counting in units of the still images.

19. An image analysis method including, by a computer:

acquiring analysis information being information acquired by analyzing a plurality of images and including an appearance attribute for each person included in the plurality of images; and counting, for each of the appearance attributes, the number of persons belonging to the appearance attribute in the plurality of images by using the analysis information, and generating counting information indicating a result of the counting.

20. A program for causing a computer to execute:

acquiring analysis information being information acquired by analyzing a plurality of images and including an appearance attribute for each person included in the plurality of images; and counting, for each of the appearance attributes, the number of persons belonging to the appearance attributes in the plurality of images by using the analysis information, and generating counting information indicating a result of the counting.

21. An image analysis method including, by a computer:

acquiring analysis information being information acquired by analyzing a plurality of images and including an appearance attribute for each person included in the plurality of images; and counting the number of persons belonging to a combination of a plurality of appearance attributes by using the analysis information, and generating counting information indicating a result of the counting.

22. A program for causing a computer to execute:

acquiring analysis information being information acquired by analyzing a plurality of images and including an appearance attribute for each person included in the plurality of images; and counting the number of persons belonging to a combination of a plurality of appearance attributes by using the analysis information, and generating counting information indicating a result of the counting.

What is claimed is:

1. An image analysis apparatus comprising:

a memory configured to store instructions; and a processor configured to execute the instructions to:

acquire analysis information being information acquired by analyzing a still image and including an appearance attribute to which a person included in the still image belongs;

count, for each of the appearance attributes, the number of persons belonging to the appearance attribute in the still image by using the analysis information, and generate counting information indicating a result of the counting in units of the still images; and in response to a selection of the appearance attribute, control a display screen to display additional information indicating a person belonging to the selected appearance attribute, wherein the additional information is superimposed on the still image.

2. The image analysis apparatus according to claim 1, wherein the processor is configured to further execute the instructions to:

control the display screen to display, in units of the still images, the still image together with counting information associated with the still image.

3. The image analysis apparatus according to claim 1, wherein:

the still image is one of images constituting a moving image; and the processor is configured to further execute the instructions to:

control the display screen to display each of the still images constituting the moving image, together with counting information associated with the still image.

4. The image analysis apparatus according to claim 1, wherein:

the analysis information includes reliability for each of the appearance attributes; and the processor is configured to further execute the instructions to:

control the display screen to display reliability of the appearance attribute of a person belonging to the selected appearance attribute.

5. The image analysis apparatus according to claim 1, wherein the acquiring analysis information is information acquired by analyzing the still image comprising acquiring analysis information being information acquired by analyzing a plurality of still images, and wherein the counting, for each of the appearance attributes, the number of persons belonging to the appearance attribute in the still image comprising counting, for each of the appearance attributes, the number of persons belonging to the appearance attribute in the plurality of still images.

6. An image analysis apparatus comprising:

a memory configured to store instructions; and a processor configured to execute the instructions to:

acquire analysis information being information acquired by analyzing a plurality of images and including an appearance attribute for each person included in the plurality of images; and count for each combination of the plurality of appearance attributes, the number of persons belonging to all of the plurality of appearance attributes constituting the combination, and generate counting information that indicates, for each combination, the counted number and is arranged in descending order of the counted number.

7. The image analysis apparatus according to claim 6, wherein the analysis information is information indicating a result of analyzing the image by using a plurality of types of engines for analyzing the image, and includes an appearance attribute of a person included in the image.

8. The image analysis apparatus according to claim 6, wherein the processor is configured to further execute the instructions to:

control a display screen to display information on a first combination being a combination of a plurality of appearance attributes having the largest number of persons belonging to a combination of the plurality of appearance attributes, based on the counting information.

9. The image analysis apparatus according to claim 6, wherein the counting the number of persons includes counting, for each capturing condition, the number of persons belonging to each combination of the plurality of appearance attributes by using the analysis information, and generating counting information indicating a result of the counting.

10. The image analysis apparatus according to claim 9, wherein the capturing condition includes at least one of weather, day of week, time zone, season, and capturing apparatus.

11. An image analysis method comprising, by a computer:

acquiring analysis information being information acquired by analyzing a still image and including an appearance attribute to which a person included in the still image belongs;

counting, for each of the appearance attributes, the number of persons belonging to the appearance attribute in the still image by using the analysis information, and generating counting information indicating a result of the counting in units of the still images; and in response to a selection of the appearance attribute, controlling a display screen to display additional information indicating a person belonging to the selected appearance attribute, wherein the additional information is superimposed on the still image.

12. The image analysis method according to claim 11, further comprising:

controlling the display screen to display, in units of the still images, the still image together with counting information associated with the still image.

13. The image analysis method according to claim 11, wherein:

the still image is one of images constituting a moving image; and the image analysis method further comprises:

controlling the display screen to display each of the still images constituting the moving image, together with counting information associated with the still image.

14. The image analysis method according to claim 11, wherein:

the analysis information includes reliability for each of the appearance attributes; and the image analysis method further comprises:

controlling the display screen to display reliability of the appearance attribute of a person belonging to the selected appearance attribute.

15. The image analysis method according to claim 11, wherein the acquiring analysis information is information acquired by analyzing the still image comprising acquiring analysis information being information acquired by analyzing a plurality of still images; and wherein the counting, for each of the appearance attributes, the number of persons belonging to the appearance attribute in the still image comprising counting, for each of the appearance attributes, the number of persons belonging to the appearance attribute in the plurality of still images.

* * * * *